(12) United States Patent
Bair, Jr. et al.

(10) Patent No.: US 8,041,741 B1
(45) Date of Patent: Oct. 18, 2011

(54) SEARCHING CONTENT USING A DIMENSIONAL DATABASE

(75) Inventors: John R. Bair, Jr., Bainbridge Island, WA (US); Les Colligon, Tracy, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 12/780,608

(22) Filed: May 14, 2010

Related U.S. Application Data

(60) Division of application No. 11/751,465, filed on May 21, 2007, now Pat. No. 7,747,617, which is a continuation of application No. 09/954,719, filed on Sep. 17, 2001, now Pat. No. 7,493,308.

(60) Provisional application No. 60/237,672, filed on Oct. 3, 2000.

(51) Int. Cl.
*G06F 17/00* (2006.01)

(52) U.S. Cl. ......... 707/791; 707/802; 707/822; 707/828

(58) Field of Classification Search ........... 707/600–831
See application file for complete search history.

(56) References Cited

U.S. PATENT DOCUMENTS

| | | | |
|---|---|---|---|
| 6,003,024 A | 12/1999 | Bair et al. | |
| 6,233,573 B1 | 5/2001 | Bair et al. | |
| 6,243,723 B1 | 6/2001 | Ikeda et al. | |
| 6,256,623 B1 | 7/2001 | Jones | |
| 8,256,623 | 7/2001 | Jones | |
| 6,466,940 B1 | 10/2002 | Mills | |
| 6,810,404 B1 * | 10/2004 | Ferguson et al. | 1/1 |
| 7,010,537 B2 | 3/2006 | Eyal et al. | |

OTHER PUBLICATIONS

Pedersen, T.B. et al., "Multidimensional data modeling for complex data," Mar. 23-26, 1999, *IEEE*, pp. 336-345.

Toyama, M. et al., "Hash-based symmetric data structure and join algorithm applications," Aug. 2-4, 1999, pp. 231-238.

\* cited by examiner

*Primary Examiner* — Isaac M Woo

(74) *Attorney, Agent, or Firm* — Kilpatrick Townsend & Stockton LLP

(57) ABSTRACT

A software facility for selecting documents is disclosed. The facility maintains a dimensional model of a group of documents. The dimensional model reflects values for a number of differentiated attributes for each of the documents of the group. The facility receives a query specifying values for one or more of these attributes. In response to receiving the query, the facility uses the dimensional model to generate a list of documents in the group having the attribute values specified by the query.

17 Claims, 14 Drawing Sheets

SEARCHING CONTENT USING A DIMENSIONAL DATABASE

CROSS-REFERENCES TO RELATED APPLICATIONS

This application is a divisional application of U.S. patent application Ser. No. 11/751,465, entitled "Searching Documents Using a Dimensional Database," filed Mar. 21, 2007, which is a continuation of U.S. patent application Ser. No. 09/954,719, entitled "Searching Documents Using a Dimensional Database," filed Sep. 17, 2001, now U.S. Pat. No. 7,493,308, issued Feb. 17, 2009, which claims the benefit of U.S. Provisional Application No. 60/237,672, entitled "Multidimensional Search of Documents," filed Oct. 3, 2000, which are all hereby incorporated herein by references.

TECHNICAL FIELD

The present invention is directed toward the field of content searching, and more particularly to the field of web-based document searching.

BACKGROUND OF THE INVENTION

The World Wide Web ("the web") is a distributed international electronic library of documents and other data resources. A particular document is accessed on the web using a unique identifier for the document, called a "URL," short for Uniform Resource Locator. If a user seeking to access a particular document has the URL for the document, s/he may simply type it into the URL field of a web browser. In many cases, the URL for a document may be obtained from a second, related document containing a link to the first document.

It is conservatively estimated that over a billion documents are available on the web. (Indeed, smaller "webs," such as "Intranets" used only by the employees of a particular business, may themselves provide access to hundreds of thousands of documents.) For a particular user having a particular need, the web may contain several documents that address the need, all unknown to the user. For example, for a user interested in details of the 1955 grape harvest in Eastern Washington, 15 documents may be available on the web that contain such information, all unknown to the user.

In order to help users identify documents on the web relating to particular subjects, hierarchical web directories and web search engines have been developed. A hierarchical web directory is a set of human-compiled lists of documents available via the web each relating to a particular subject represented in a hierarchy of topics. Table 1 below shows a designation of a hierarchical web directory topic corresponding to a list of documents available via the web that includes documents containing information about the 1955 grape harvest in Eastern Washington.

TABLE 1

| Society and Culture |
|---|
|   Food and Drink |
|     Spirits |
|       Wine |
|         Regional |
|           Eastern Washington |

The topic corresponding to the list, Eastern Washington, is a subtopic of the topic "Regional," which is a subtopic of the topic "Wine," which is a subtopic of the topic "Spirits," which is a subtopic of the topic "Food and Drink," which is a subtopic of the topic "Society and Culture." In order to provide a hierarchical web directory, its provider must create a hierarchy of topics, identify documents available via the web, and identify topics to whose lists the identified documents should be added.

A web search engine, on the other hand, allows users to type one or more key words and returns a list of documents containing those keywords. In particular, web search engines typically include documents in the list that have the highest percentages of occurrences of the key words among all of the documents. For example, to identify documents containing details of the 1955 grape harvest in Eastern Washington, a user might type the key word string "1955 grape harvest Eastern Washington." The web search engine processes such queries against a database representing the contents of as many web pages as possible, typically gathered by "spidering," or automatically traversing links from known web pages to new web pages.

Both of these conventional approaches to identifying documents on the web have significant disadvantages. Hierarchical web directories are extremely labor intensive, requiring human editors to review and categorize web documents. This reliance on manual processes often results in outdated or inaccurate content. Also, hierarchical web directories are only usable to identify web pages relating to topics created by human editors. Hierarchical web directories are also difficult for users to successfully use, as a user must typically select the exact same sequence of subtopics as the person that catalogued the web site.

Web search engines, while not typically suffering from the deficiencies of hierarchical web directories relating to their manual nature, have the disadvantage that they rely on the occurrence of particular key words in sought web pages. Because many words have multiple meanings, Web search engines often generate false positive matches, where a keyword appears in the Web page in a different sense than the sense intended by the user in formulating the query. On the other hand, because of the large number of words that can be used to get across the same idea, Web search engines also often generate false negative matches. Web search engines also typically filter out noise words that occur in most web pages, such as "an" or "if," which make it impossible to search for web pages using these words when using a web search engine. Further, aside from applying certain frequency analysis techniques, web search engines typically ignore the specific usage and significance of particular key words in the searched web pages.

Accordingly, a more effective approach to identifying documents on the web and in other electronic libraries would have significant utility.

DETAILED DESCRIPTION

Figure 1:
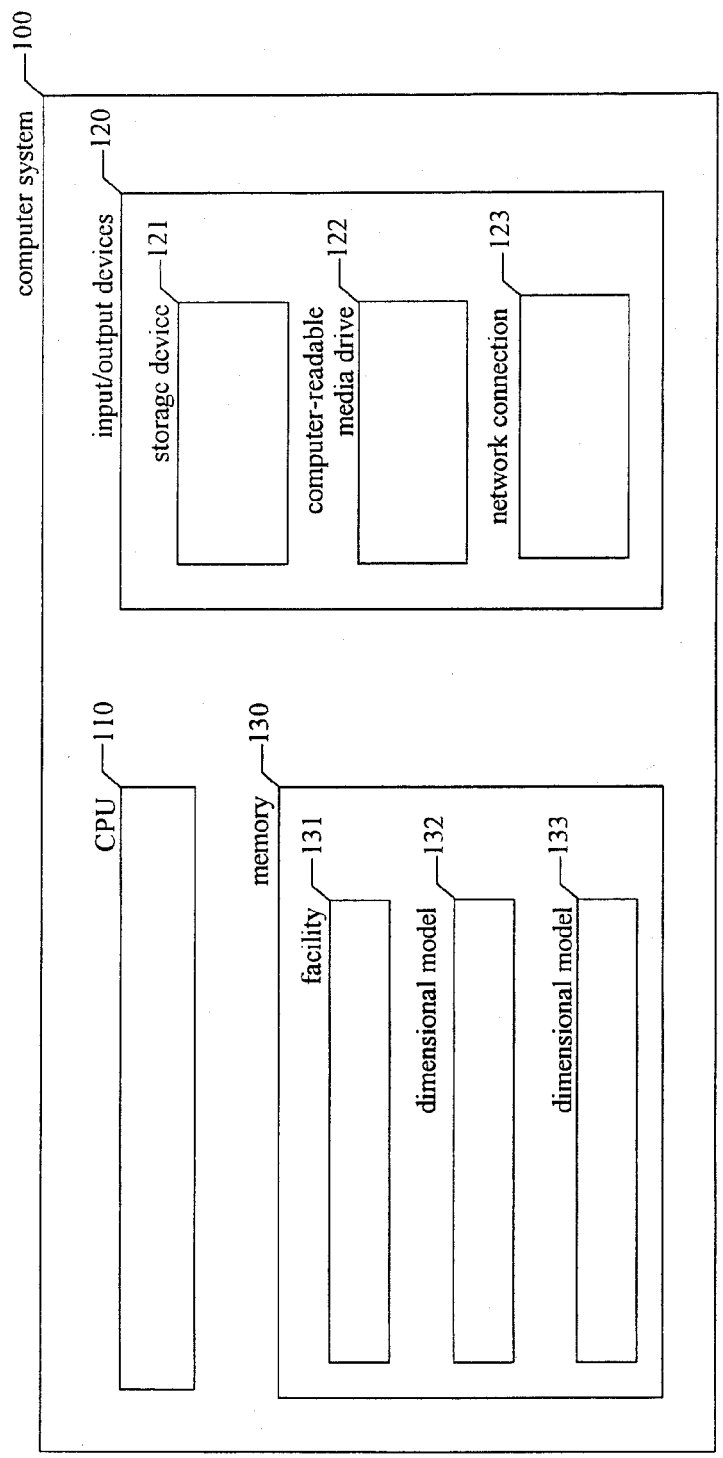
FIG. 1 is a high-level block diagram of the computer system upon which the facility preferably executes.

Embodiments of the present invention provide a software facility for selecting documents or other types of resources using a dimensional model ("the facility"). In some embodiments, the facility is adapted to select web pages in response to user queries.

The facility preferably generates and maintains a dimensional model of a number of documents, such as web pages. For each modeled document, the model contains information about the document in at least a portion of a number of different informational dimensions. For example, for documents that are home pages of companies, the facility preferably includes in the model for each modeled document indications of the name, type, category, and location of the company. The facility preferably obtains this information using one or more of a variety of techniques, including manual or automatic submission, or automatic spidering combined with parsing and/or natural language understanding.

The facility preferably maintains the information obtained for modeled documents in a dimensional model. The dimensional database techniques discussed herein are well-known to those skilled in the art, and are described in greater detail in Kimball, Ralph: *"The Data Warehouse Toolkit Practical Techniques for Building Dimensional Data Warehouses,"* 1996. The model includes a fact table that contains a row for each of the modeled documents. For example, the fact table may be comprised of rows each corresponding to a company home page, and containing the URL for that company home page. The model further includes a dimension table for each of the modeled dimensions. For example, the model may include four dimension tables, one each for the company_name, company_type, company_category, and company_location dimensions. Each dimension table has a row for each unique value of the dimension. For example, the company_location dimension table may have a row for each unique location of one or more modeled company root pages.

The model may be normalized by joining all of the rows of all of the dimension tables to the fact table, generating a result table in which each row explicitly contains all of the information about one document. This result table, however, can be many times larger than the entire model, and is less efficient than the model for use in executing queries.

The facility receives queries that specify functions on at least some of the modeled dimensions. For example, the facility may receive a query that specifies values for three of the four modeled dimensions. To process the query, for each specified dimension value, the facility selects the rows of the corresponding dimension table that match the value. The facility then joins the selected rows in the dimension tables to the fact table. The result table from this join is generally of manageable size, and contains a row for each document that satisfies the query, and is preferably used by the facility to generate a query result that the user can use to access the documents that satisfies the query.

In this manner, document queries that more effectively describe sought documents may be processed without requiring significant manual effort on the part of the operators of the facility or relying on the adequacy of such effort, producing more useful query results than conventional document searching approaches.

FIG. 1 is a high-level block diagram of the computer system upon which the facility preferably executes. The computer system 100 contains one or more central processing units (CPUs) 110, input/output devices 120, and a computer memory (memory) 130. Among the input/output devices is a persistent storage device 121, such as a hard disk drive, and a computer-readable media drive 122, which can be used to install software products, including components of the facility, which are provided on a computer-readable medium, such as a CD-ROM. The input/output devices also include a network connection 123, through which the computer system 100 may be connected to the network to be analyzed by the facility. The memory 130 preferably contains the dimensional search facility 131, as well as dimensional models of document sets 132 and 133, both preferably generated and used by the facility. While items 131-133 are preferably stored in memory while being used, those skilled in the art will appreciate that these items, or portions of them, may be transferred between memory and the persistent storage device for purposes of memory management and data integrity. While the facility is preferably implemented on a computer system configured as described above, those skilled in the art will recognize that it may also be implemented on computer systems having different configurations, or distributed across multiple computer systems.

Figure 2:
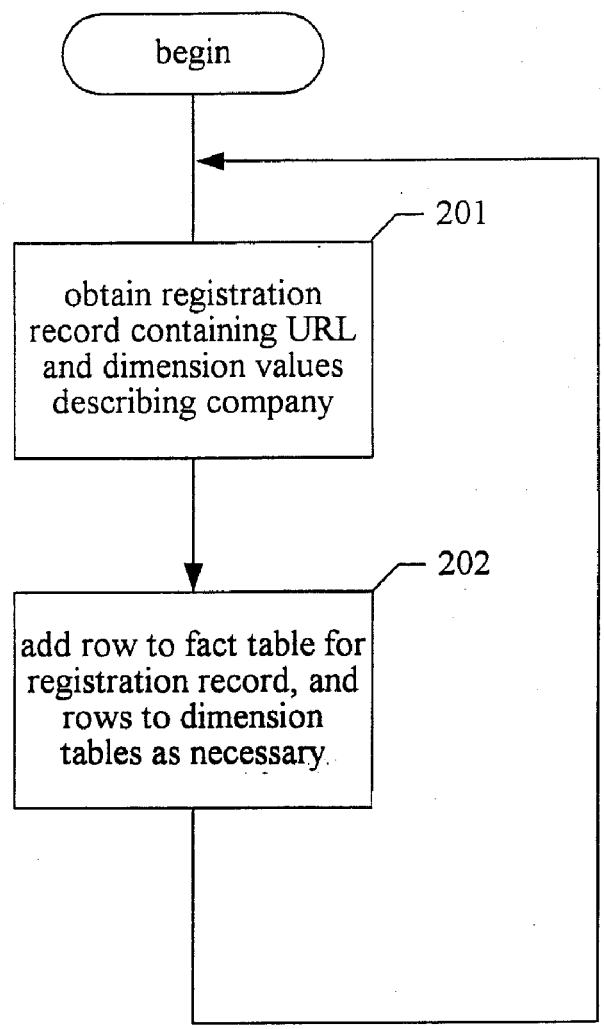
FIG. 2 is a flow diagram showing the steps preferably performed by the facility in order to construct a dimensional model.

FIG. 2 is a flow diagram showing the steps preferably performed by the facility in order to construct a dimensional model. Those skilled in the art will appreciate that these steps could be used to construct several different dimensional models simultaneously. In step 201, the facility obtains a registration record containing the URL for a company root page or other modeled document, as well as dimension values describing the company, or other attributes of the document. The facility preferably obtains this registration information in a variety of different ways, including receiving a registration form filled out by someone responsible for the document, such as the webmaster for a company root page, or such as by automatically exploring and analyzing documents.

Figure 3:
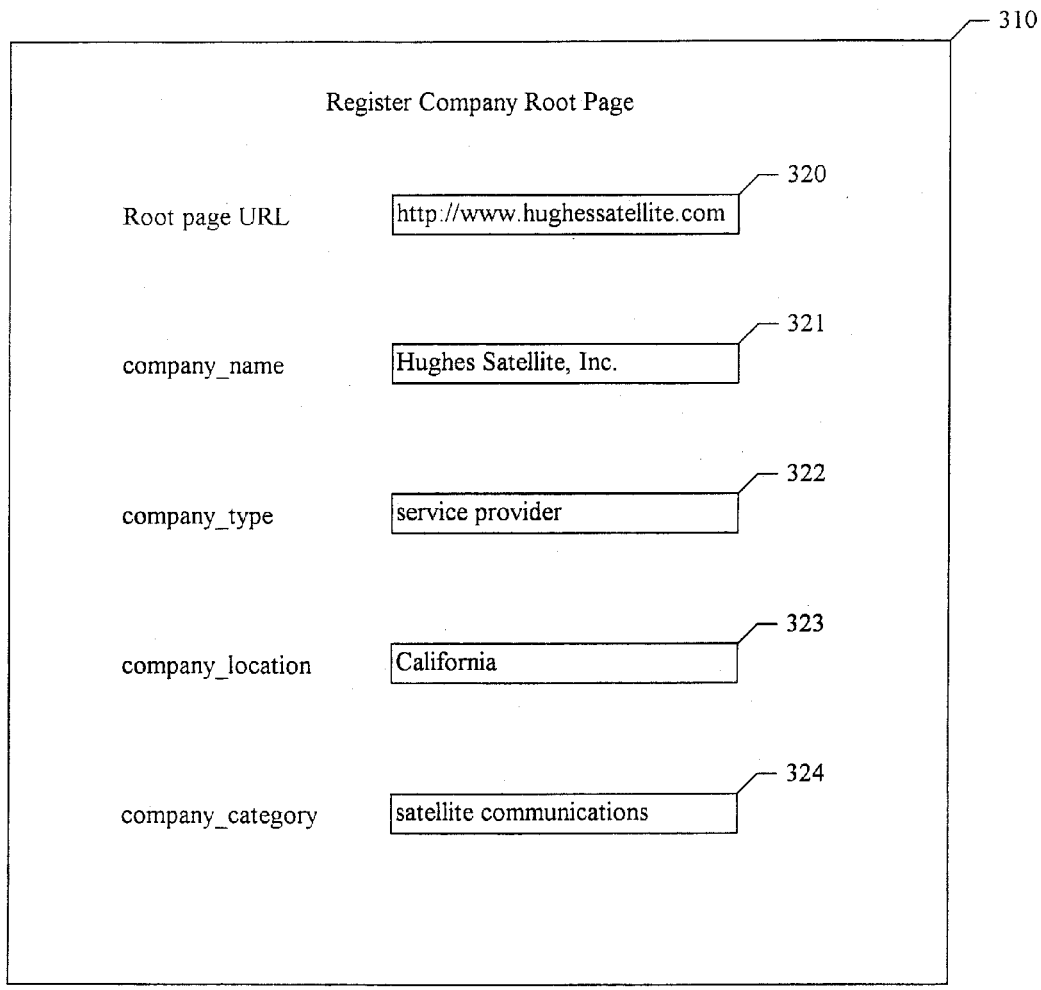
FIG. 3 is a diagram showing a registration form completed by the webmaster of a company root page.

FIG. 3 is a diagram showing a registration form completed by the webmaster of a company root page. The form 310 contains a field 320 in which the URL used to identify the company root page has been entered. It will be appreciated by those skilled in the art that the facility may use many different types of references, or "links," to refer to modeled documents and other resources. For example, URLs specified in accordance with RFC 1738 may be used to refer to online resources, as may various other electronic naming conventions. Additionally, various schemes, such as street addresses or Dewey decimal numbers, may be used to refer to offline resources. Fields 321-324 are fields into which attribute values for the company root page have been entered.

Figure 4:
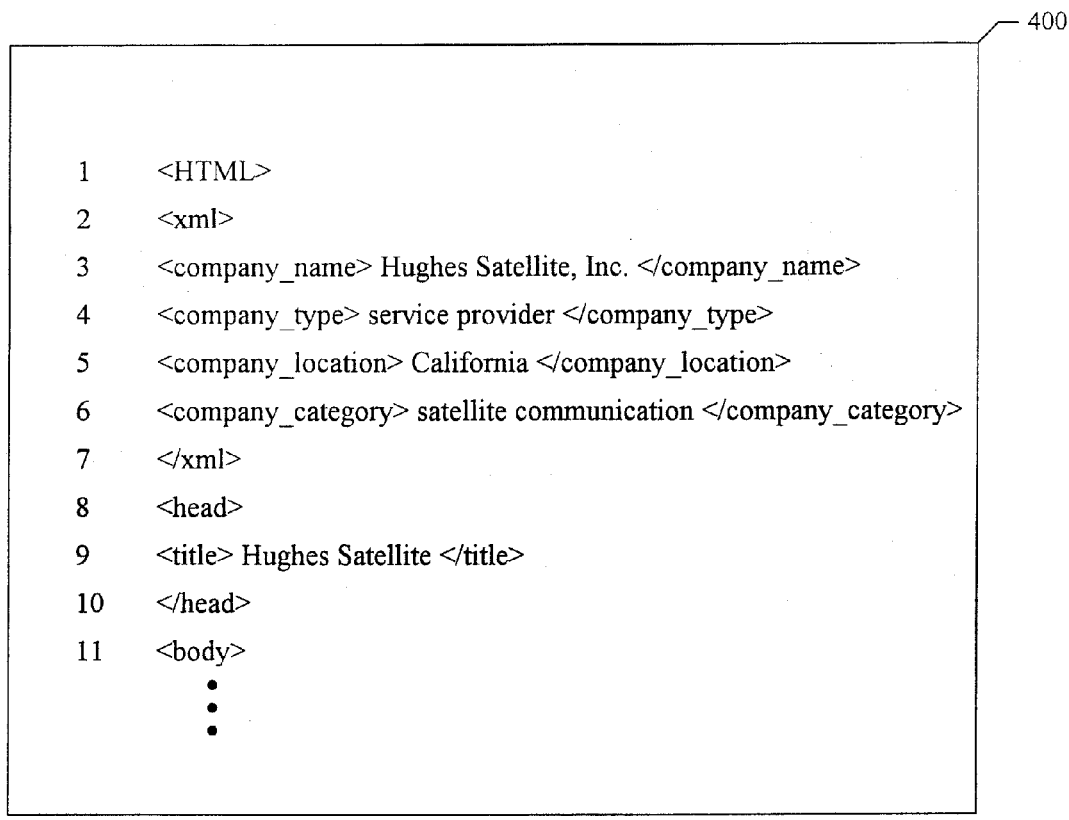
FIG. 4 is a diagram showing the source code for a sample company root page as automatically located and parsed by the facility.

FIG. 4 is a diagram showing the source code for a sample company root page as automatically located and parsed by the facility. Source code segment 400 shows the first eleven lines of the source code. As the source code was retrieved by the facility using the URL for the company root page, the URL for the source code is known to the facility. Attribute values for the company root page are specified on lines 3-6 in the XML block occurring in lines 2-7. These lines are preferably inserted into the HTML source code by the webmaster of the company root page to support indexing by the facility, as well as for a variety of other purposes. Embedding XML source code within HTML source code in this manner has been proposed by some commentators to support the inclusion of XML data in existing HTML documents. Alternatively, attribute information may be included in existing HTML constructs, such as the HTML <span> tag. For example, the attribute value information shown on line 3 would be encoded using the <span> tag as follows:

"<span class=company_name> Hughes Satellite, Inc. </span>"

Where the company root page is expressed in XML, the attribute information is merely included in custom attribute tags that are added by the webmaster to the XML document comprising the root page.

Returning to FIG. 2, in step 202, the facility adds a row to the fact table of the dimensional model for the registration record obtained in step 201. The facility further adds rows to dimension tables of the dimensional model as necessary. After step 202, the facility continues in step 201 to obtain the next registration record.

Figure 5:
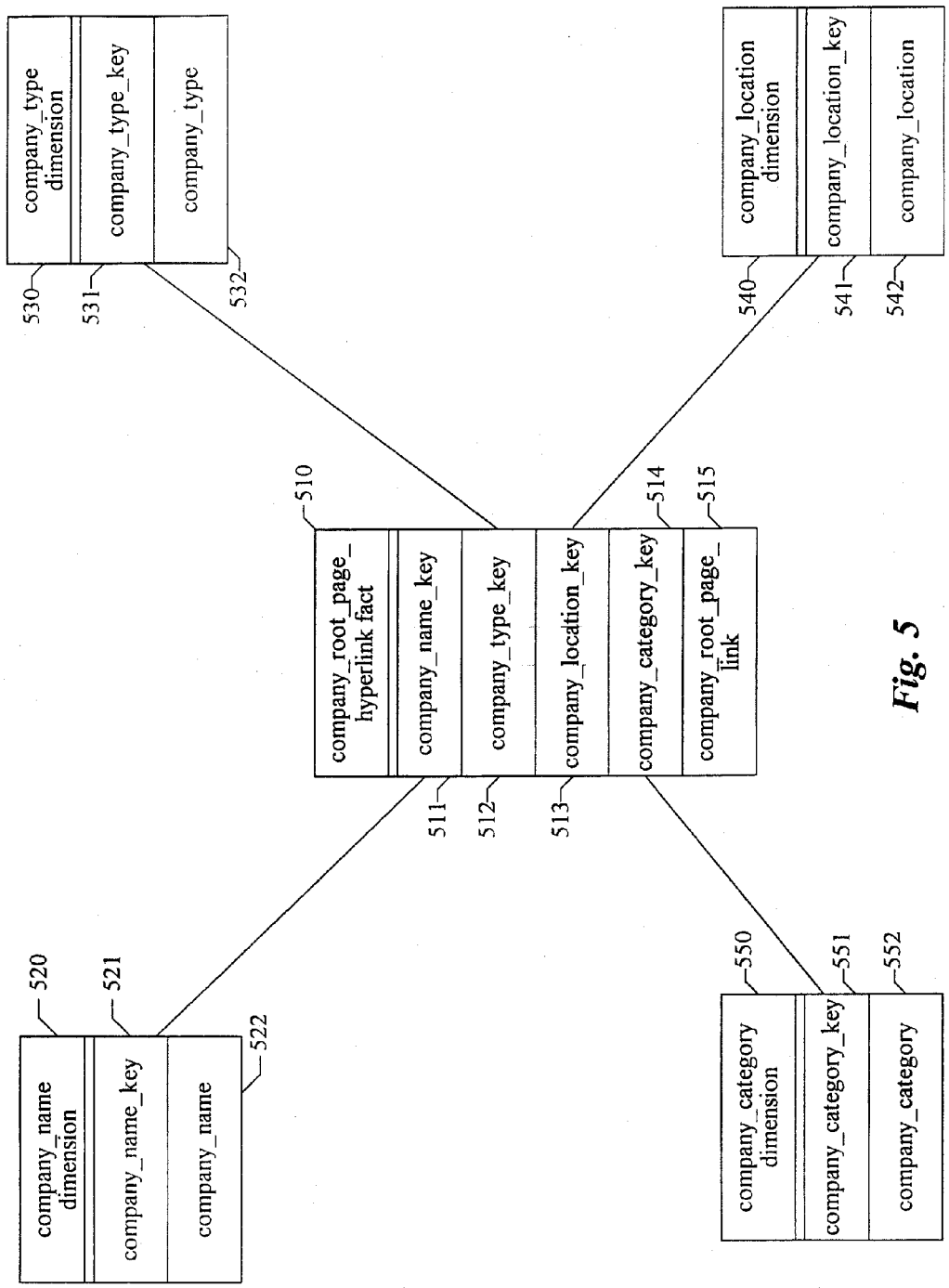
FIG. 5 is the data structure diagram showing the definition of a sample dimensional model in dimensional database notation.

FIG. 5 is the data structure diagram showing the definition of a sample dimensional model in dimensional database notation. The model has a single fact table 510, and four dimension tables 520, 530, 540, and 550. Dimension table 520 is for the company_name dimension and contains a company_name field 522 and a company_name_key field 521 in each row. Dimension table 530 is for the company_dimension, and contains a company_type field 532 and a company_type_key field in each row. Dimension table 540 is for the company_location dimension, and contains a company_location field 542 and a company_location_key field 541 in each row. Dimension table 550 is for the company_category dimension, and contains a company_category field 552 and a company_category_key field 551 in each row. The fact table 510 contains a row for each modeled document. Each row contains a company_name_key field 511, which contains the key corresponding in the company_name dimension table 520 the value of the company_name attribute for the company root page to which the row of the fact table corresponds. The line between fields 511 and 521 indicates that tables 510 and 520 can be joined on the company_name_key field. Such a join operation, if applied to all of the rows of both tables, would produce a result table containing all of the information in the fact table, plus an additional column containing the company_name field for each row. The fact table further contains key fields 512, 513, and 514, through which the fact table may be joined to dimension tables 530, 540, and 550, respectively. Finally, fact table 510 includes a company_root_page_link field 515 that, in each row, contains a link to the company root page to which the row corresponds. In one embodiment, in which two or more documents may have all the same attribute values, a row of the fact table may correspond to more than one document. In this case, rows of the fact table that correspond to more than one modeled document preferably include the URL to a web page containing a list of these documents rather than a URL directly to a particular document. In an additional embodiment, rows that contain such a URL further include an indication of the number of documents listed at that URL. This indication may be a count of these documents, may indicate a range into which the number of documents falls, or may simply indicate whether the number of listed documents makes the list of documents too large to retrieve, at least under certain circumstances.

In some embodiments, the facility supports hierarchical dimensions. For example, rather than merely reflecting a city, a more thorough hierarchical notion of the company_location dimension as shown below in Table 2 may be used:

TABLE 2

Country
State
City

Such hierarchical dimensions may be represented either in a single dimension table containing a column for each hierarchical component of the dimension, i.e., a single company_location dimension table containing separate columns for country, state, and city, or by using a "snowflaked" sequence of dimension tables emanating from the fact table in decreasing level of detail, i.e., a dimension table for city, referred to by the fact table and referring to a dimension table for state, which in turn refers to a dimension table for country.

Figure 6:
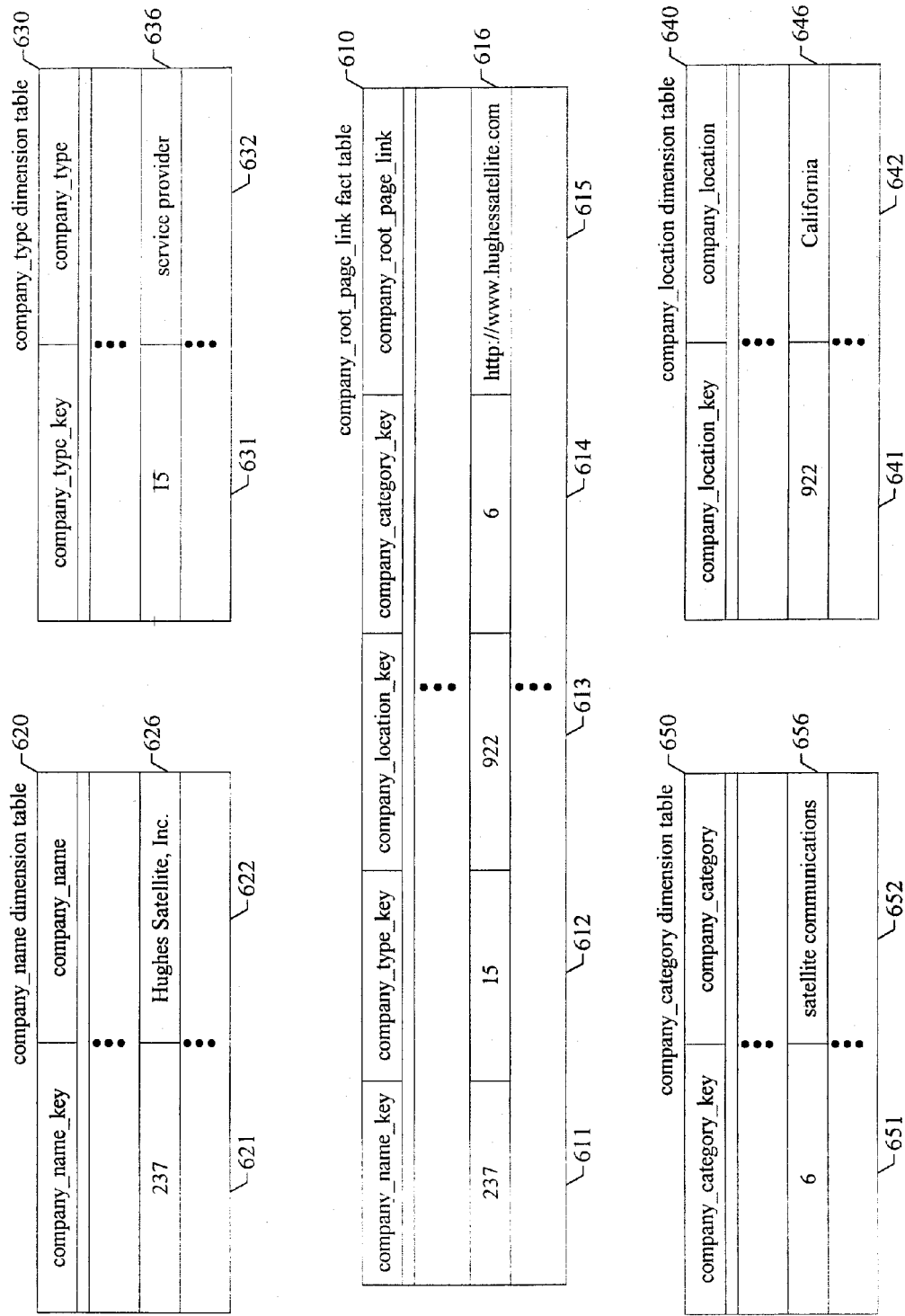
FIG. 6 is a data structure diagram showing the data tables that preferably underlie the sample dimensional model shown in FIG. 5.

FIG. 6 is a data structure diagram showing the data tables that preferably underlie the sample dimensional model shown in FIG. 5. The diagram shows fact table 610, as well as dimension tables 620, 630, 640, and 650. The fact table 610 has columns 611-614, each corresponding to the key of one of the dimension tables. For example, sample row 616, corresponding to the sample company root page whose attribute values are shown in FIGS. 3 and 4, contains the company_name_key 237, as does row 626 of dimension table 620 for the company_name dimension. That row of dimension table 620 indicates that the company root page to which row 616 of the fact table corresponds has the value "Hughes Satellite, Inc." for the company_name attribute. The fact table 610 further includes column 615, which contains in each row the URL of the company root page to which the row corresponds, in this case, "http://www.hughessatellite.com". When the facility obtains the attribute information for this company root page, it adds row 616 to the fact table 610. It further searches each of the dimension tables to determine whether the obtained attribute value for that dimension is already contained in the dimension table. If so, the facility merely copies the key for that row of the dimension table into the row being added to the fact table. If the attribute value is not already in the dimension table, then the facility adds a row to the dimension table containing the attribute value and a key that is unique within the dimension table, and adds that key to the row being added to the fact table.

Figure 7:
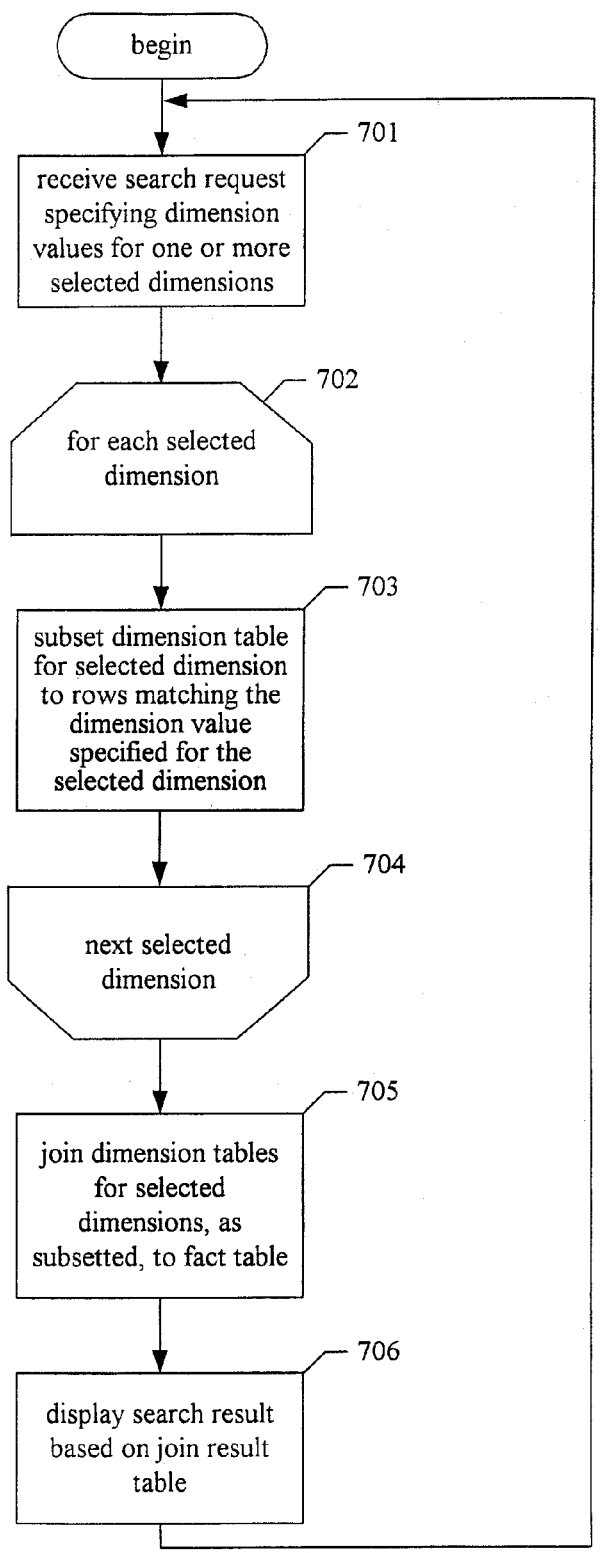
FIG. 7 is a flow diagram showing the steps preferably performed by the facility in order to process search requests against the dimensional model.

FIG. 7 is a flow diagram showing the steps preferably performed by the facility in order to process search requests against the dimensional model. In step 701, the facility receives a search request that specifies dimension values for one or more selected dimensions. Rather than specifying a value for each such dimension, in some embodiments, the search request may specify other tests with respect to a dimension, such as whether the dimension value is non-null, whether it falls within a particular range of dimension values or within a list of dimension values, whether it matches a pattern, or whether it satisfies an arbitrary programmatic or mathematical function.

Figure 8:
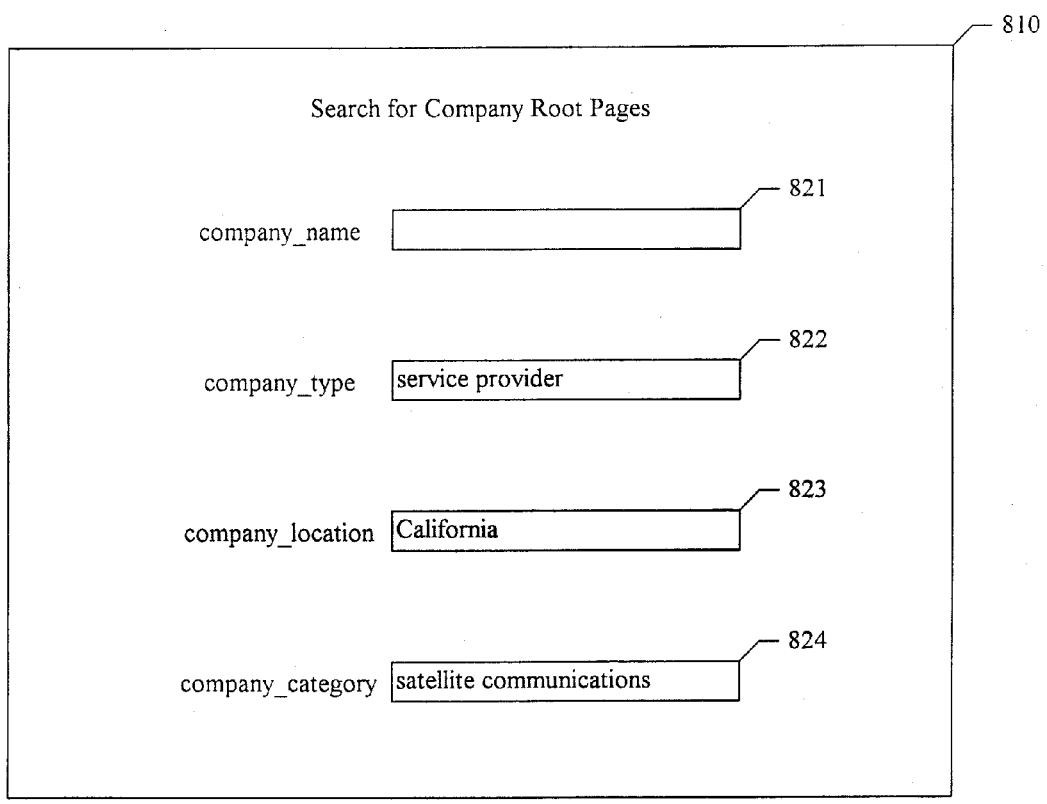
FIG. 8 is a diagram showing a sample search request.

FIG. 8 is a diagram showing a sample search request. The search request 810 contains dimension values 822-824 provided by a user for the company_type, company_location, and company_category dimensions, respectively. This search request is for the company root pages of service provider companies in the satellite communications area that are located in California.

Figure 9:
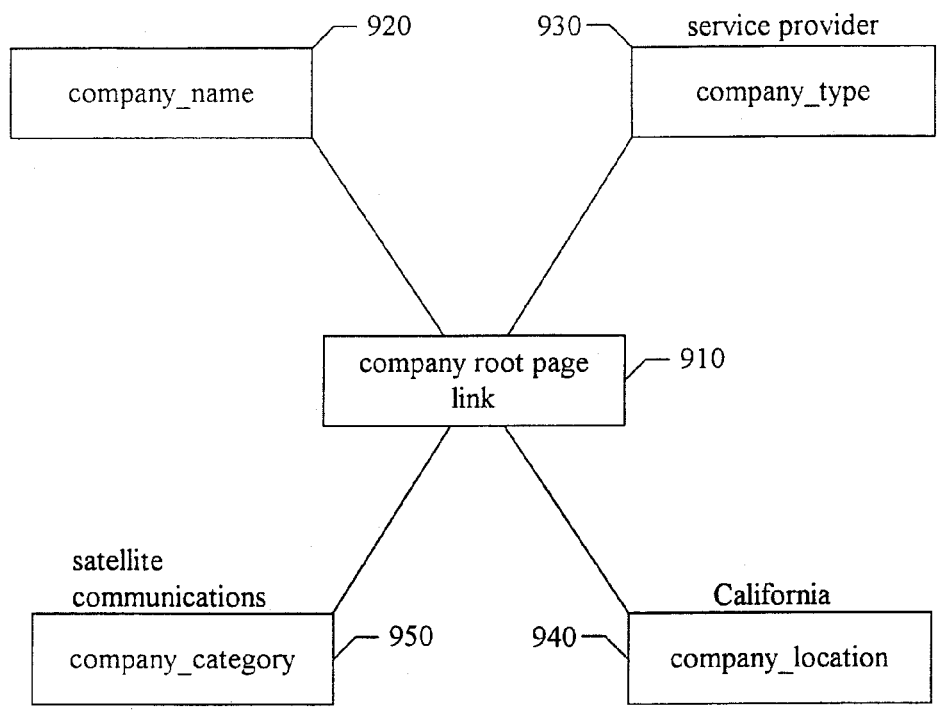
FIG. 9 is a diagram showing a representation of the search request shown in FIG. 8 expressed in a search request star notation.

FIG. 9 is a diagram showing a representation of the search request shown in FIG. 8 expressed in a search request star notation. The search request star shown is comprised of nodes 910, 920, 930, 940, and 950. The search request star shown specifies the value "service provider" for the company_type dimension in node 930, specifies the value "California" for the company_location dimension in node 940, and specifies the value "satellite communications" for the company_category dimension in node 950.

Figure 10:
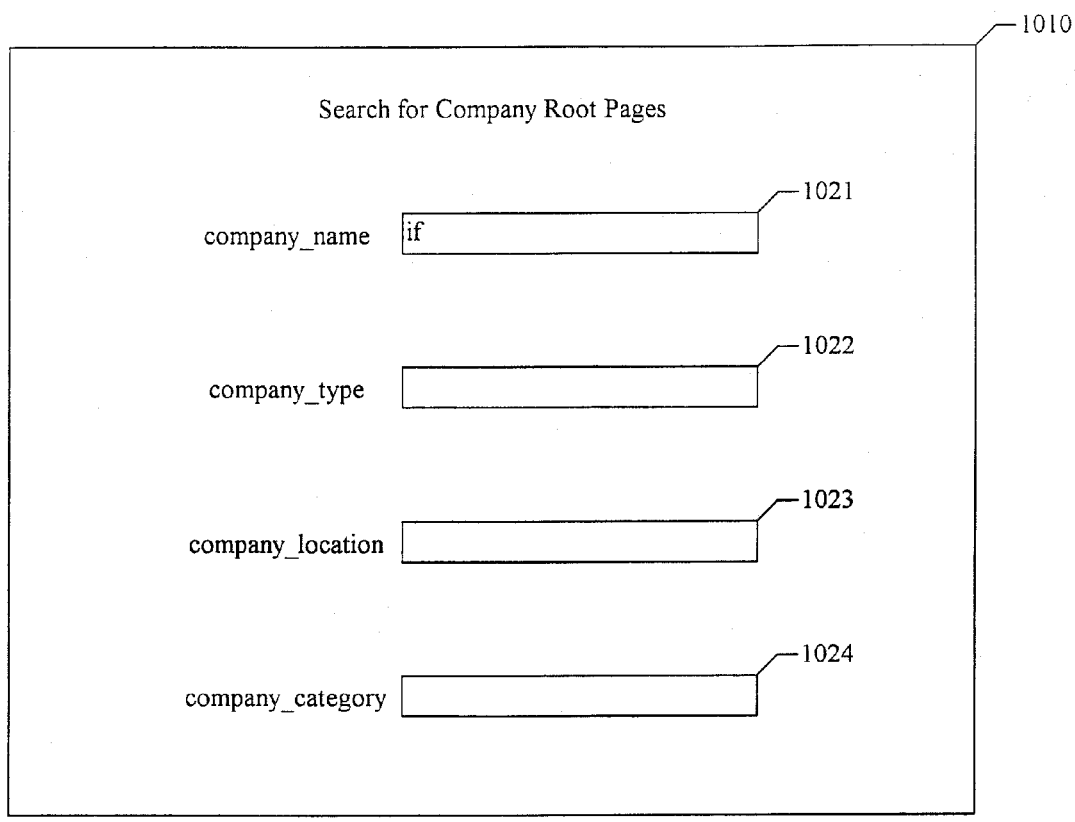
FIG. 10 is a diagram showing a second sample search request for the same dimensional model.
Figure 11:
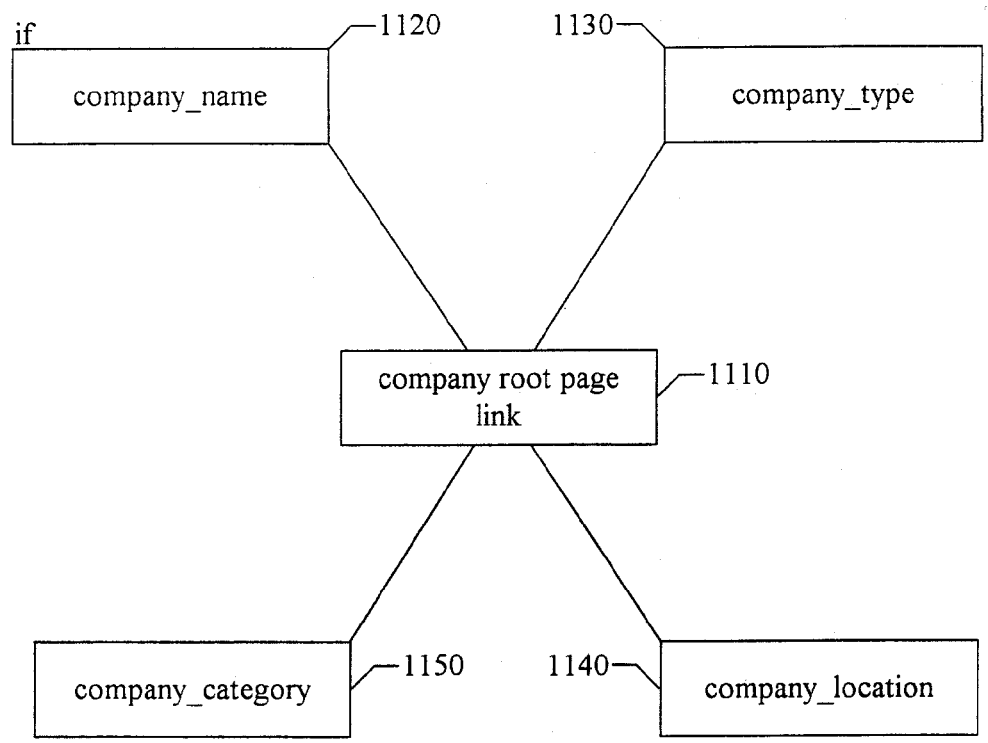
FIG. 11 is a diagram showing the second sample search request expressed in search request star notation.

FIG. 10 is a diagram showing a second sample search request for the same dimensional model. The diagram shows a search request for the company root pages of companies whose names contain the word "if". FIG. 11 is a diagram showing the same search request expressed in search request star notation. Search requests such as this one may be executed using a variety of well-known searching techniques. These include regular expression matching techniques that may be coded and called from within a database server, such as an Oracle database server, as well as techniques using an SQL-like predicate. Those skilled in the art will recognize that additional techniques may also be employed.

Returning to FIG. 7, the facility repeats steps 702-704 for each dimension selected in the search request. In step 703, the facility subsets the dimension table for the selected dimension down to the rows matching the dimension value specified in the search request for the selected dimension or satisfying the tests specified in the search request for the selected dimension. In other words, the facility selects the rows of the dimension table for the selected dimension whose dimension values match the specified dimension value. In step 704, if additional selected dimensions remain to be processed, the facility continues in step 702 to process the next selected dimension. When all of the selected dimensions have been processed, the facility continues in step 705. In step 705, the facility joins the dimension tables for the selected dimensions, as subsetted in step 703, to the fact table of the dimensional model. The result table produced by this join operation contains a row for each modeled document that satisfies the search request. Each row of the result table preferably contains a URL or other reference to the document satisfying the search, and, optionally, the values of attributes of each document, including attributes corresponding to dimensions not selected in the search request. For example, when each document is a book, the result table may include the current rank of the book on the New York Times bestseller list. In some embodiments, the dimension processing represented by steps 702-704 and the fact processing represented in step 705 are parallelized and proceed concurrently (not shown). In step 706, the facility displays a search result to the user based on the table produced by the join operation. After step 706, the facility continues in step 701 to process the next search request.

Figure 12:
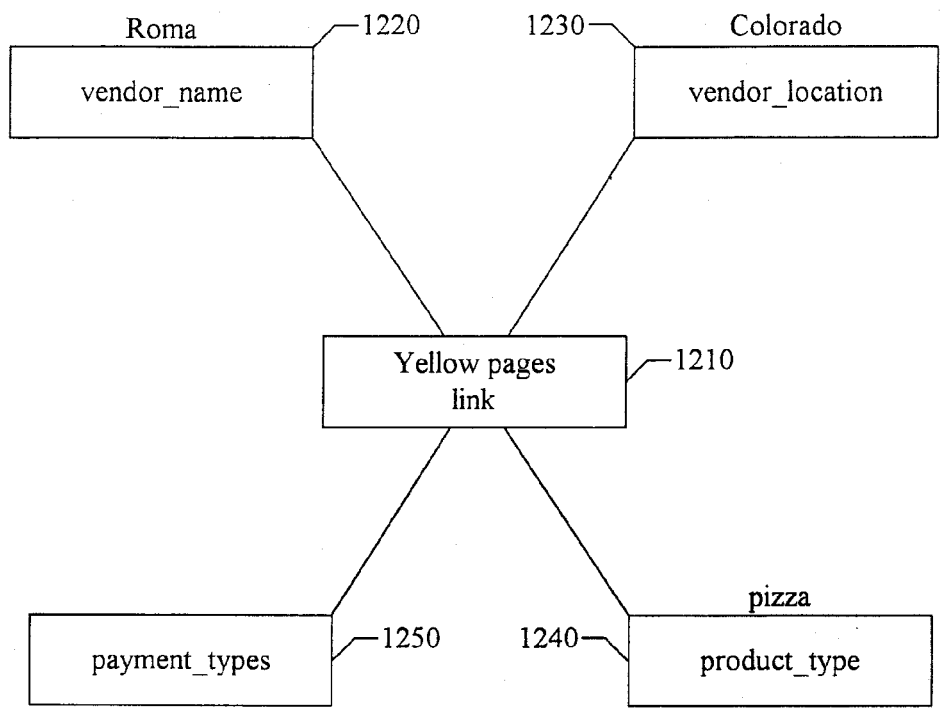
FIG. 12 is a diagram showing a search request, expressed in star notation, for a yellow pages entry, i.e., an entry in a business telephone directory.
Figure 13:
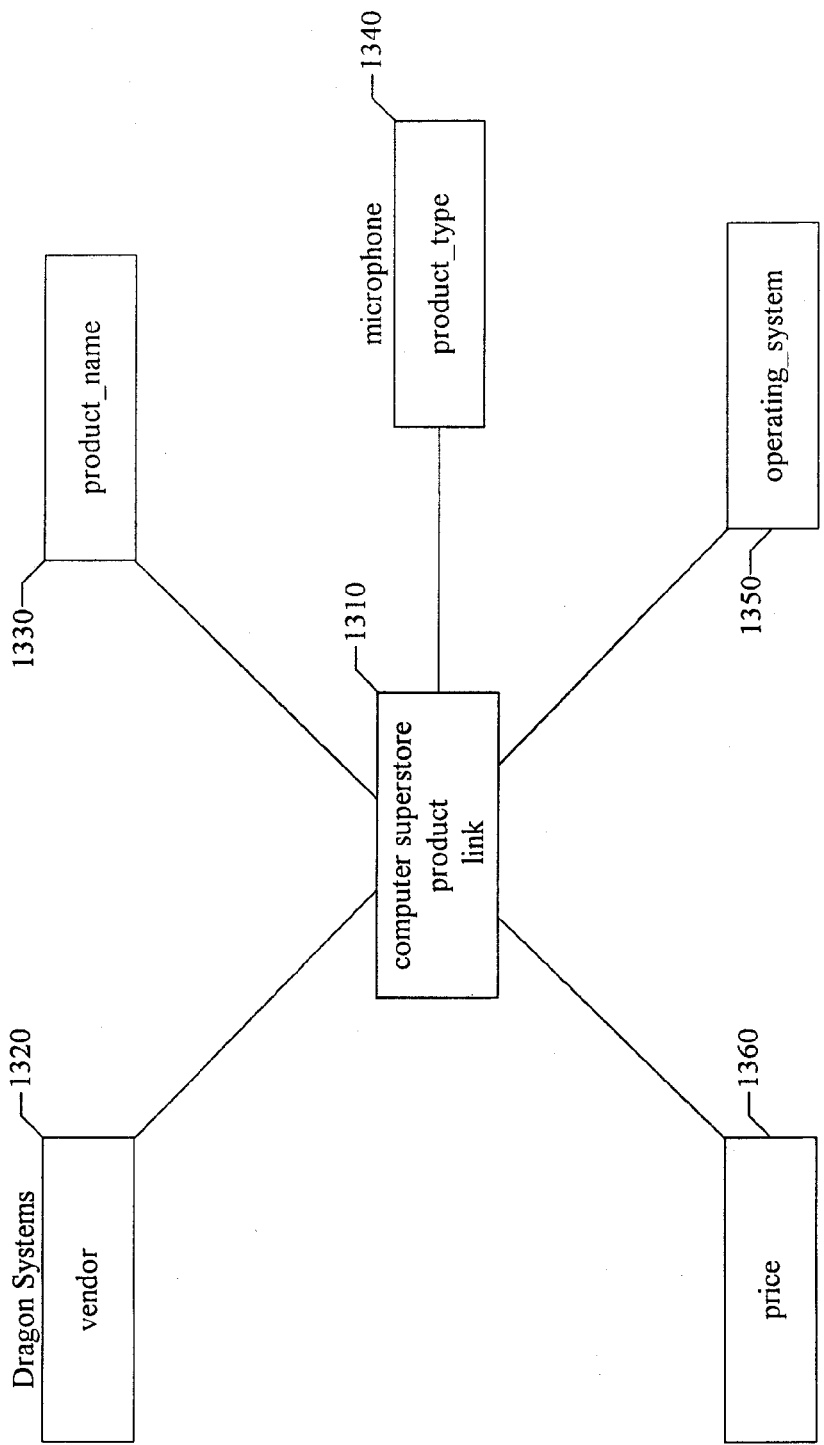
FIG. 13 is a diagram showing a search request, expressed in search request star notation, for descriptions of products sold by a computer superstore.
Figure 14:
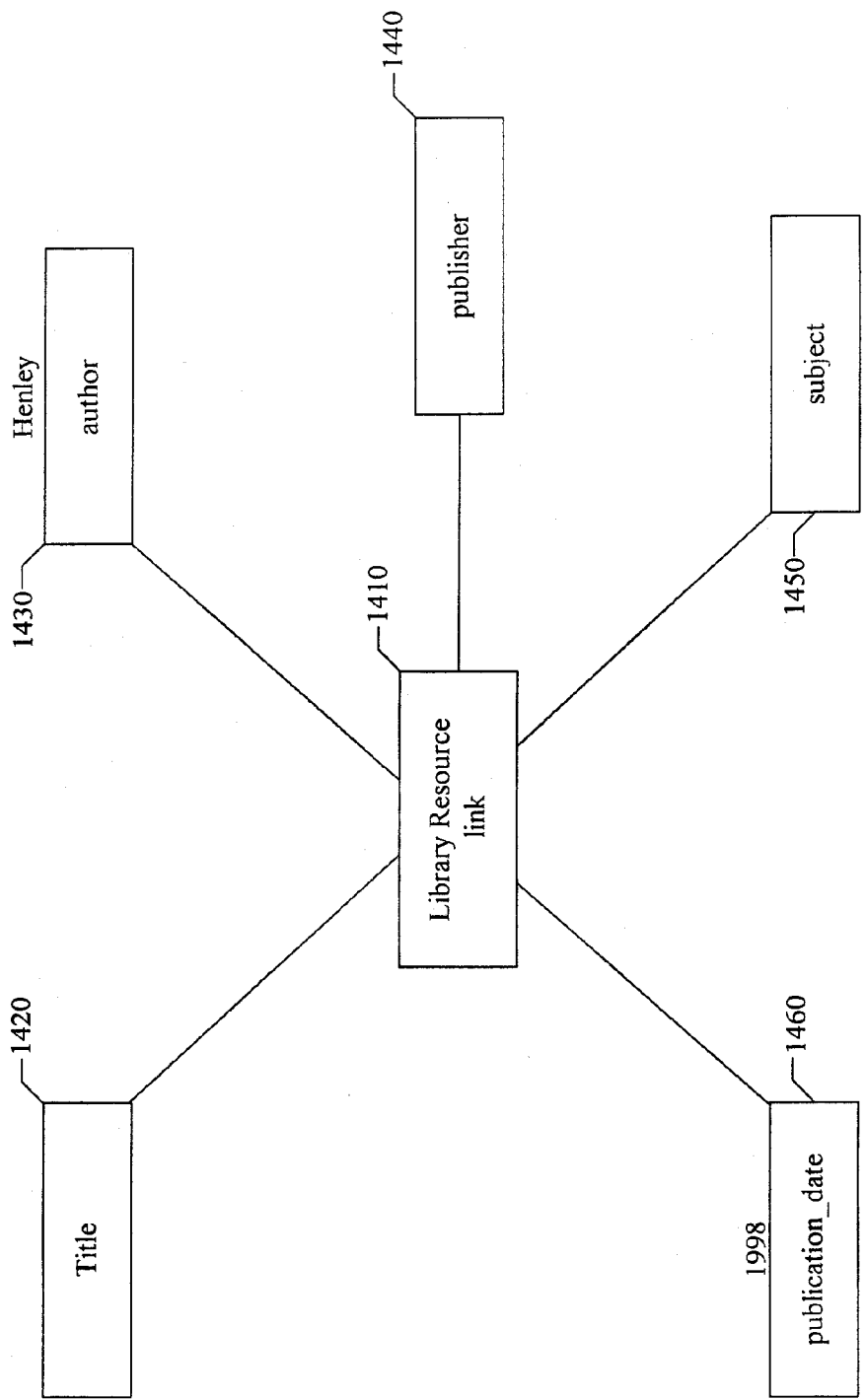
FIG. 14 is a diagram showing a search request, expressed in search request star notation, for a library resource, such as a book or an audio or video recording.

As will be appreciated by those skilled in the art, the facility may be employed to generate and respond to search requests for dimensional models for a wide variety of document groups and the attributes of the constituent documents. FIGS. 12-14 show a few examples for other groups of documents.

FIG. 12 is a diagram showing a search request, expressed in search request star notation, for yellow pages entries, i.e., entries in a business telephone directory. As can be seen from nodes 1220, 1230, 1240, and 1250, the model for yellow pages entries models the entries on the following attributes: vendor name, vendor location, product_type, and payment_types. As can be seen from nodes 1220, 1230, and 1240, the query shown is for vendors whose names contain the word "Roma", whose locations contain the word "Colorado", and whose product types include the word "pizza".

FIG. 13 is a diagram showing a search request, expressed in search request star notation, for descriptions of products sold by a computer superstore. As can be seen from nodes 1320, 1330, 1340, 1350, and 1360, the model for computer superstore product descriptions models the descriptions on the following attributes: vendor, product_name, product_type, operating_system, and price. As can be seen from nodes 1320 and 1340, the query shown is for computer superstore product descriptions for microphone products from Dragon Systems.

FIG. 14 is a diagram showing a search request, expressed in search request star notation, for a library resource, such as a book or an audio or video recording. As can be seen from nodes 1420, 1430, 1440, 1450, and 1460, the model for library resources models library resources on the following attributes: title, author, publisher, subject, and publication_date. As can be seen from nodes 1430 and 1460, the query shown is for library resources published in 1998 by an author named Henley.

It will be understood by those skilled in the art that the above-described facility could be adapted or extended in various ways. For example, the facility may be used to model and select documents, other data artifacts, or other resources of virtually any type, including programmatic objects, such as COM or CORBA components or Java applets. While the foregoing description makes reference to preferred embodiments, the scope of the invention is defined solely by the claims that follow and the elements recited therein.

What is claimed is:

1. A computer-implemented method for collecting information about a group of documents, comprising:
under control of one or more computer systems configured with executable instructions, seeding the group of documents with one or more seed documents;
identifying, in at least a portion of the group of documents, at least one reference to at least one secondary document;
adding to the group of documents at least one secondary document obtainable using the identified at least one reference;
identifying, for at least a portion of the documents in the group of documents, two or more attribute values associated with at least one aspect of the document;
adding at least a portion of the identified attribute values to a set of information associated with the group of documents, the set of information enabling documents in the group of documents to be located based at least in part upon any of the attribute values in the set of information;
applying a test to at least one secondary document; and
adding the attribute values identified for the at least one secondary document to the set of information associated with the group of documents only if the applied test is satisfied.

2. The computer-implemented method of claim 1, wherein at least one reference comprises a hyperlink.

3. The computer-implemented method of claim 1, wherein at least a portion of the secondary documents added to the group of documents comprise web pages.

4. The computer-implemented method of claim 1, further comprising, for each secondary document:
   applying a test to the secondary document; and
   adding the secondary document to the group of documents only if the applied test is satisfied.

5. The computer-implemented method of claim 1, further comprising:
   receiving a search request specifying attribute values for each of one or more predetermined document attributes and requesting a report of documents from the group of documents having the specified attribute values for the one or more predetermined document attributes.

6. The computer-implemented method of claim 5, further comprising:
   processing the received search request using the group of documents and the associated set of information.

7. The computer-implemented method of claim 6, wherein processing the received search request further comprises:
   determining documents in the group of documents having the specified attribute values for the one or more predetermined document attributes based at least in part upon the associated set of information; and
   transmitting a report of the determined documents to a source of the request.

8. The computer-implemented method of claim 1, wherein the attribute values are obtained for at least a portion of the group of documents by traversing references between documents of the group and parsing the contents of traversed-to documents.

9. The computer-implemented method of claim 1, wherein attribute values are obtained for at least a portion of the plurality of documents by receiving submissions indicating the attribute values associated with each document.

10. A system for collecting information about a group of documents, comprising:
    at least one processor; and
    memory including instructions that, when executed by the at least one processor, cause the system to:
       seed the group of documents with one or more seed documents;
       identify, in at least one seed document, at least one reference to at least one secondary document;
       if a first test is satisfied, add to the group of documents at least one secondary document obtainable using the identified at least one reference;
       identify, for at least a portion of the documents in the group of documents, two or more attribute values associated with at least one aspect of the document; and
       if a second test is satisfied, add at least a portion of the identified attribute values to a set of information associated with the group of documents, the set of information enabling documents in the group of documents to be located based at least in part upon any of the attribute values in the set of information.

11. The system of claim 10, wherein at least one reference comprises a hyperlink, and at least a portion of the secondary documents added to the group comprise web pages.

12. The system of claim 10, wherein the instructions when executed further cause the system to:
    receive a search request specifying attribute values for each of one or more predetermined document attributes and request a report of documents from the group of documents having the specified attribute values for the one or more predetermined document attributes based at least in part upon the associated set of information.

13. The system of claim 12, wherein the search request is received from a source, the instructions when executed further causing the system to:
    determine documents in the group of documents having the specified attribute values for the one or more predetermined document attributes based at least in part upon the associated set of information; and
    transmit a report of the determined documents to the source.

14. A computer readable storage medium including instructions that, when executed by a processor, cause the processor to:
    seed a group of documents with one or more seed documents; and
    identify, in at least one seed document, at least one reference to at least one secondary document;
    if a first test is satisfied, add to the group of documents at least one secondary document obtainable using the identified at least one reference;
    identify, for at least a portion of the documents in the group of documents, two or more attribute values associated with at least one aspect of the document; and
    if a second test is satisfied, add at least a portion of the identified attribute values to a set of information associated with the group of documents, the set of information enabling documents in the group of documents to be located based at least in part upon any of the attribute values in the set of information.

15. The computer readable storage medium of claim 14, wherein at least one reference comprises a hyperlink, and at least a portion of the secondary documents added to the group comprise web pages.

16. The computer readable storage medium of claim 14, wherein the instructions when executed further cause the system to:
    receive a search request specifying attribute values for each of one or more predetermined document attributes and request a report of documents from the group of documents having the specified attribute values for the one or more predetermined document attributes based at least in part upon the associated set of information.

17. The computer readable storage medium of claim 16, wherein the search request is received from a source, the instructions when executed further causing the system to:
    determine documents in the group of documents having the specified attribute values for the one or more predetermined document attributes based at least in part upon the associated set of information; and
    transmit a report of the determined documents to the source.

* * * * *